United States Patent [19]
Bevis et al.

[11] 3,920,971
[45] Nov. 18, 1975

[54] OFF-LINE TOOL GAGE

[75] Inventors: Robert Charles Bevis; Thiagarajan Viswanathan, both of Cincinnati, Ohio; Howard Joseph Theis, California, Ky.

[73] Assignee: Cincinnati Milacron Inc., Cincinnati, Ohio

[22] Filed: Mar. 28, 1974

[21] Appl. No.: 455,556

[52] U.S. Cl............ 235/151.11; 33/169 R; 33/201; 235/151.32
[51] Int. Cl.²......................................... G06F 15/46
[58] Field of Search.................. 235/151.11, 151.32; 318/565, 572; 33/125 M, 169 R, 169 C, 201

[56] References Cited
UNITED STATES PATENTS

| | | |
|---|---|---|
| 3,587,360 | 6/1971 | Oxenham.................. 235/151.11 X |
| 3,597,093 | 8/1971 | Wolf................................. 33/201 X |
| 3,636,814 | 1/1972 | Esch................................. 33/201 X |
| 3,676,935 | 7/1972 | Klausing........................... 33/201 X |
| 3,701,199 | 10/1972 | Lewis................................ 33/169 R |
| 3,746,845 | 7/1973 | Henegar et al. ............... 235/151.11 |

Primary Examiner—Malcolm A. Morrison
Assistant Examiner—Jerry Smith
Attorney, Agent, or Firm—C. Richard Eby

[57] ABSTRACT

An apparatus is disclosed for measuring the dimensions of a cutting tool before the tool is loaded into a machine tool. The apparatus provides a base for maintaining a tool holder in a stationary position. A gaging device is operative to produce a signal representing the distance from a predetermined point on the tool to a reference point on the tool holder. The apparatus is further operative to communicate said signal to a control device.

9 Claims, 7 Drawing Figures

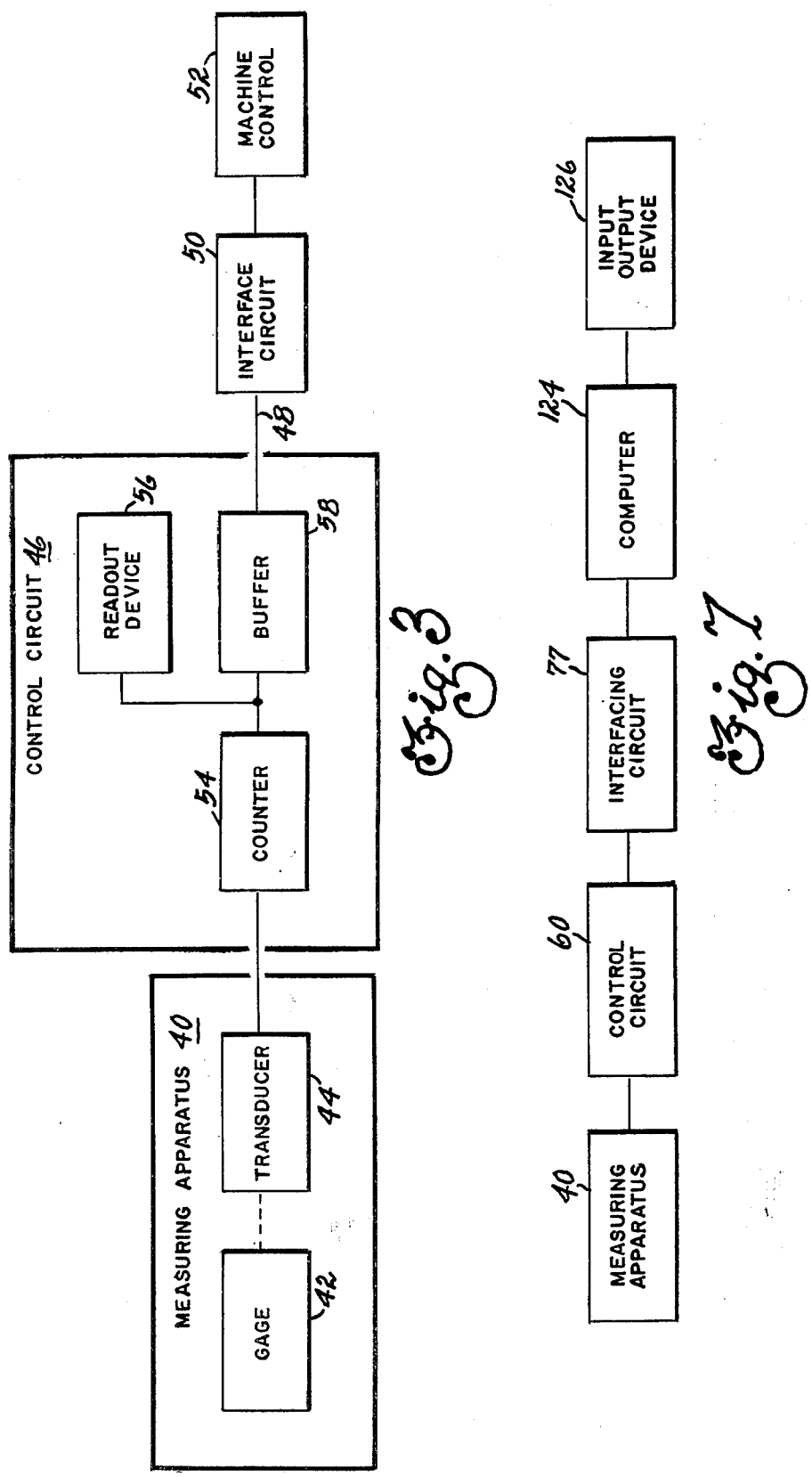

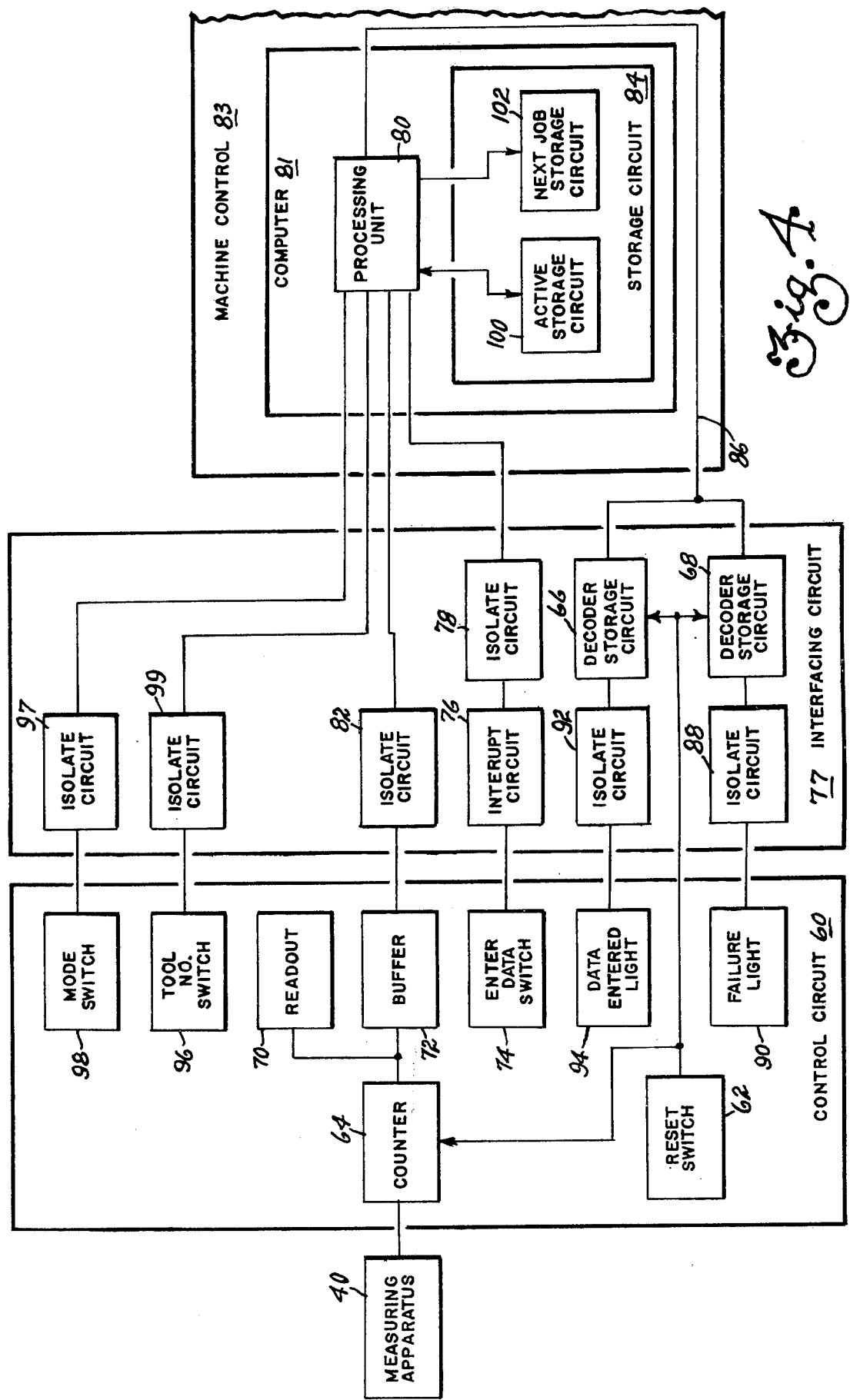

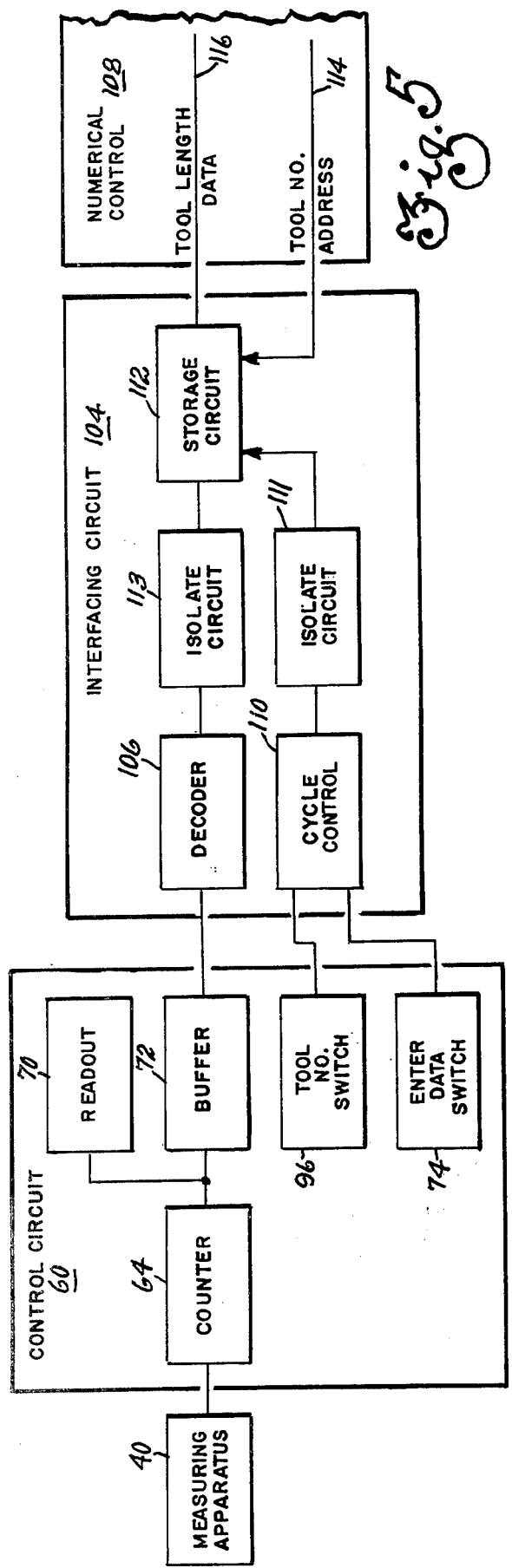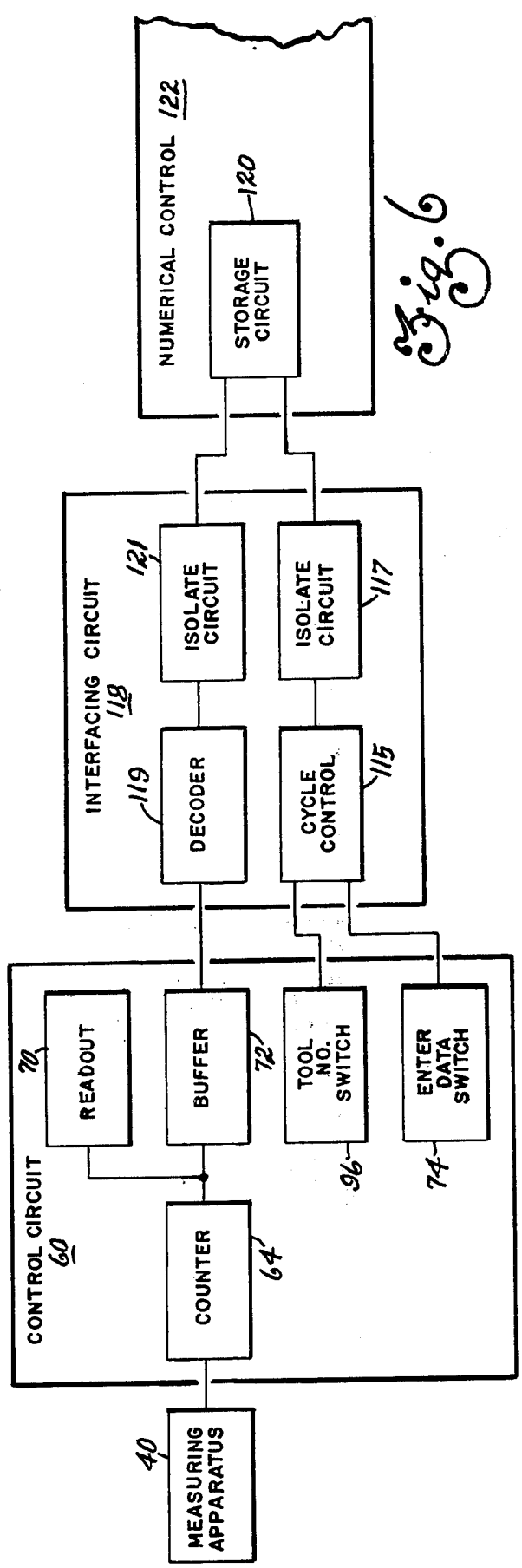

OFF-LINE TOOL GAGE

BACKGROUND OF THE INVENTION

The invention relates generally to tool length compensation for numerically controlled machine tools. Specifically, the invention provides an offline gage device for measuring the length or diameter of tools and communicating said length or diameter information to a machine tool control.

Historically, the problem of coordinating various tool lengths to a predetermined program has been solved in two ways. One technique is to have the programmer establish the tool length and write a program accordingly. In this situation, each tool is set exactly to the predetermined length before it is loaded into a machine tool. With a tool changer type of machine requiring several dozen tools, a tool length setting operation may easily consume hours of time. Further, an additional expense of special tool holders and fixtures may be necessary to facilitate the operation. However, these elements may not substantially reduce the time required for setting said tool lengths.

The second technique of accommodating various tool lengths, makes use of the capability of a numerical control. In this situation, the tools are loaded into the machine tool spindle without any concern for their particular lengths. The machine operator executes a tool setting mode of operation. There is a wide variety of cycles of operation for executing this mode. However, typically, with the cutting tool in the spindle, the operator manually feeds the spindle from a rest position to a reference point. This point is usually determined by touching the tip of the tool to a worktable on the machine or some other fixed reference plane. The numerical control is capable of measuring the length of this motion. Since the distance from the spindle rest position to the reference plane can be preset into the control, the control can calculate the length of each tool. The distance moved by the spindle in the tool length setting operation may be automatically stored in the control upon an operator command, or the distance may be stored manually via digital switches which the operation sets after observing a display of the distance moved.

Again, taking the example of a tool changer, each tool must be cycled into the spindle, manually fed to the reference plane and the extent of motion stored in the numerical control. Even though this technique is far superior to that of presetting the length of each tool, in the case of a tool changer having several dozen tools, the operation may still consume an hour or more. Considering the investment in a machine tool of this nature, an hour consumed merely in setting tool lengths represents a substantial economic loss.

A device is disclosed which is capable of measuring tool lengths and transmitting said information into a machine control. In a worst case situation, the device reduces lost machining time in determining a large number of tool lengths to minutes; and in the preferred embodiment, tool lengths may be determined and input to the control with no loss of machining time.

SUMMARY OF THE INVENTION

According to one embodiment of the invention, an apparatus is provided for generating dimensional information of a cutting tool with respect to a reference point on a toolholder securing said tool. The dimensional information is subsequently used by a control device to control a machine tool. The apparatus is comprised of a means independent of the machine tool spindle for maintaining the toolholder in a stationary position. Further, means are provided for moving a gaging member from a point on the tool to the reference point and providing measurement signals representing position increments of said motion. The apparatus includes further means responsive to the measurement signals for producing an output signal representing the distance from the point on the tool to the reference point. Finally, the apparatus contains means for communicating the measurement signal to the control device.

BRIEF DESCRIPTION OF THE DRAWINGS

FIG. 3 is a general block diagram of the invention.

FIG. 4 is a detailed block diagram illustrating the gaging system as used in conjunction with a machine control containing a computer.

FIG. 5 is a block diagram illustrating the gaging device operating in conjunction with a numerical control which does not have storage capabilities.

FIG. 6 is a block diagram illustrating the gaging device operating in conjunction with a numerical control having storage capabilities.

FIG. 7 is a block diagram illustrating the gaging device operating in a stand alone mode and including a recording device.

DESCRIPTION OF THE PREFERRED EMBODIMENT

Figure 1:
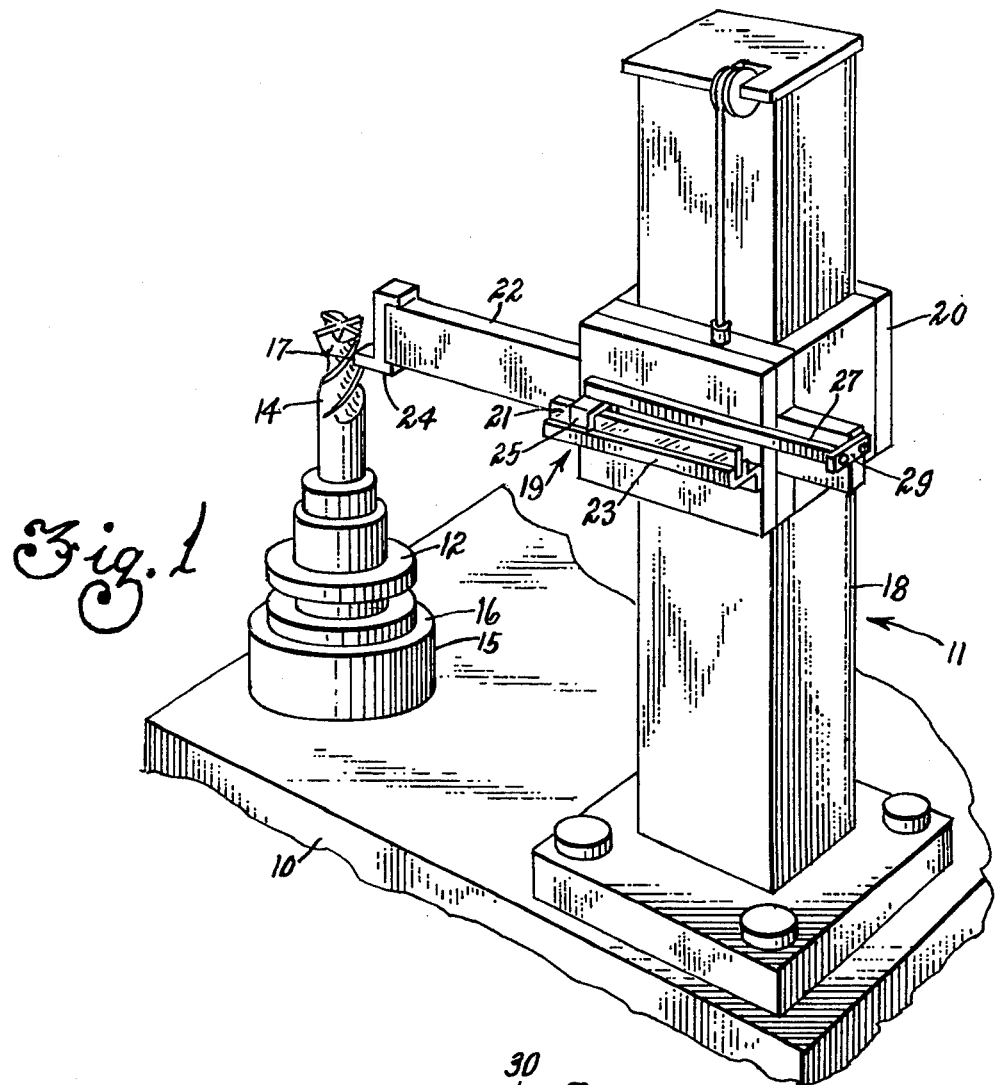
FIG. 1 illustrates the measuring apparatus used in the gaging system.

FIG. 1 illustrates the measuring device used with the disclosed gaging system. A base 10 containing a socket 15 supports the gaging apparatus 11. The base 10 may be attached to a machine tool or may be part of an independent console. The console may be designed to rest permanently in a single position or may be designed for mobility. The socket 15 is designed to receive a toolholder 12 containing a tool 14. The socket 15 simulates a machine tool spindle and maintains the toolholder 12 in a stationary position. Assume for purposes of explanation that it is desired to measure the extension of the tool 14 beyond a reference surface 16. It should be noted that the reference point chosen may vary as a function of the machine control and its programming requirements.

The measuring apparatus is comprised of a columnar way 18, a first sliding member 20, and a second sliding member 22. The second sliding member 22 contains a bearing surface 24 which is first placed against the reference plane 16. At this point, the gaging system is aligned to zero; and the bearing surface is then moved into contact with the tip of the tool 14. An enter data push button is activated, and the length of the tool is input to the control system.

Figure 2:
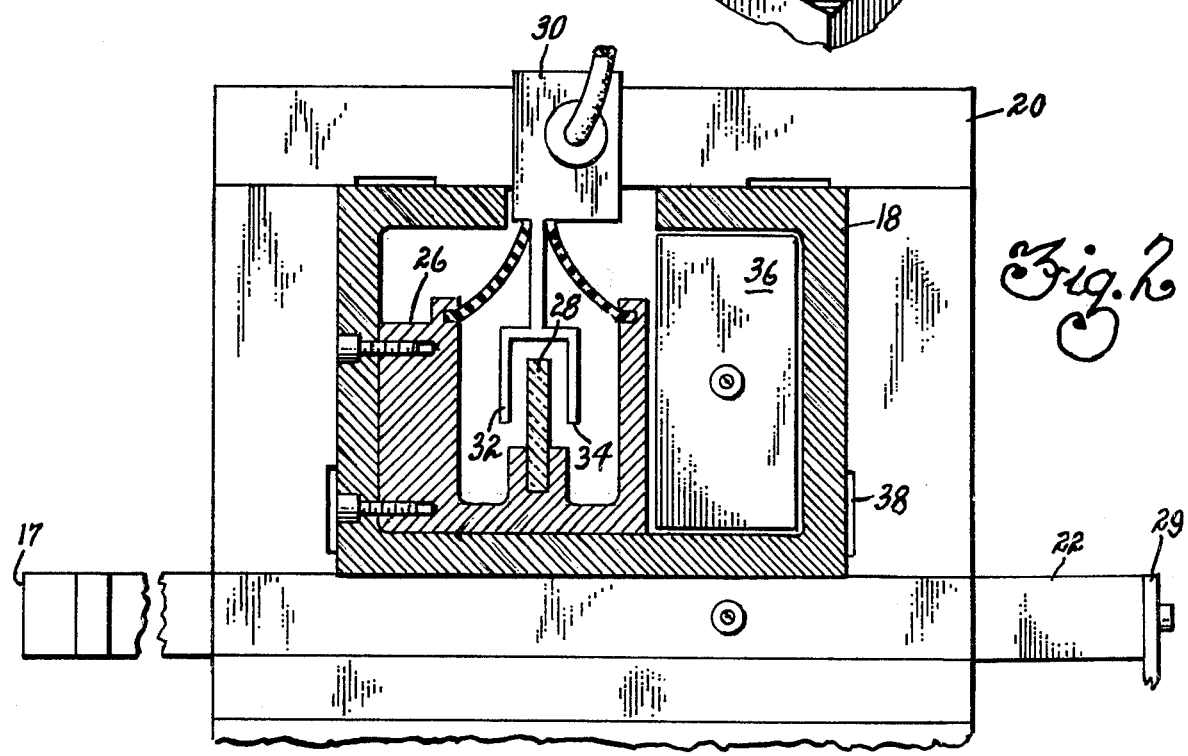
FIG. 2 is a cross section of the measuring apparatus and further discloses its construction.

FIG. 2 is a cross-section of the measuring apparatus. A transducer assembly 26 is mounted securely within the column 18. The transducer assembly contains a scale 28 which is rigidly mounted within the assembly 26. A reading head assembly 30 is secured to the first sliding means 20 and contains a photoelectric source on a first member 32 and a receiving head on a second member 34. The scale 28 contains a number of etchings; and as the first sliding member 20 moves along the column, the receiver on the member 34 produces a number of measurement signals representing increments of distance of the slider 30 over the scale 28. A counterweight 36 is also contained within the column 18 and is used to balance the first and second sliding members 20 and 22. Although a variety of bearing mechanisms may be used between the sliding members 22 and 20 and between the sliding member 20 and the column 18, a pneumatic bearing system is used in the preferred embodiment. In this case, air under pressure is input to chambers typically shown at 38 which results in very low static friction between the members.

Referring back to FIG. 1, a second transducer assembly 19, which is similar to the first transducer assembly 26, is operable to detect relative motion between the first and second sliding members 20 and 22. A scale 21 is mounted to the first sliding member 20 by means of a bracket 23. A reading head 25 is supported by a rigid member 27 which is secured to the second sliding member 22 by means of a bracket 29. Consequently, as the second member 22 moves relative to the first number 20 in a direction perpendicular to the centerline of the tool, the second transducer assembly 19 produces electric signals as a function of said distance. The above apparatus permits the gage to be used to measure the diameter of the tool 14. Before a diameter measurement is made, the gaging system must be aligned to a reference point to facilitate alignment. The outside diameter of the socket 15 may be precision machined to a predetermined diameter. Bearing surface 17 is brought in contact with the outside diameter of the socket 15 and gage is set to zero. Next, using a numerical readout, the member 22 is moved toward the center. The gage is designed to readout diameter in response to radial motion. Therefore, when the readout indicates the gage has moved an amount equal to the predetermined diameter, the bearing surface 17 will be located at the center of the socket 15. When at the center, the gage 15 is again aligned to zero. After the gage is aligned to the reference diameter, the member 22 is manually moved to bring the bearing surface 17 in contact with the outside diameter of the tool 14. When in this position, the gaging system will produce electric signals representing the diameter of the tool. As will be discussed later, the signals may be transmitted to a control system or they may be made available in the form of a readout.

It should be noted that FIG. 1 discloses a milling cutter as the tool 14 in the socket 15. The depiction of a milling cutter should not be considered a limitation on the applicability of the invention. Many turning machines are designed such that each toolholder assembly is manually preset to a predetermined length before insertion into a tool post on the machine. Without deviating from the spirit and scope of the present invention, the socket 15 may be configured to accept a toolholder of the type used on such a turning machine. Consequently, the invention is applicable to any machine using a plurality of tools having variable tool lengths or diameters.

As will be appreciated by those who are skilled in the art, the transducer assemblies disclosed above are of a digital nature. This is not to be considered a limitation on the invention. Any type of transducer assembly may be used which produces a measurement signal as a function of the distance travelled from a reference point to a point on the tool to be measured.

FIG. 3 is a block diagram illustrating the invention. A measuring apparatus similar to that described in FIGS. 1 and 2 is shown as the block 40. The measuring apparatus is comprised of a gaging mechanism 42 and a transducer 44 mechanically connected to the gaging mechanism 42. For purposes of explanation, only a single transducer will be discussed. As will be appreciated by those who are skilled in the art, additional transducers may be utilized by duplicating some of the elements to be disclosed and sharing others. Upon motion of the gaging mechanism 42 over the length or diameter of a tool, the transducer 44 produces measurement signals to a control circuit 46. The control circuit 46 receives and accumulates the measurement signals and produces an ouotput signal on the line 48 representing the distance from the point of the tool to be measured to a reference point. An interface circuit 50 is responsive to the output signal from the control circuit 46 and communicates the tool dimension information to a machine control 52. Because of the great variety of machine controls available, the exact embodiment of the interfacing circuit 50 will be a function of the type of machine control used with the gaging system.

Generally, the control circuit 46 is comprised of a counter circuit 54, a visual readout display 56, and a buffer circuit 58. After the counter 54 is preset with a number representing the reference point, it is responsive to the bidirectional motion of the gage 42 and is operative to accumulate the absolute position of the sliding member 20 with respect to the reference point. The readout 56 is responsive to the counter and displays the absolute position to the operator. The buffer 58 is also responsive to the counter 54 and produces the output signal which represents the tool dimension measurement.

FIG. 4 is a detailed block diagram illustrating the operation of the gaging system in conjunction with a machine control containing a computer. Direct numerical controls and computer numerical controls are examples of such machine controls. Again, the measuring apparatus 40 produces measurement signals to a control circuit 60. As described earlier, the gage is brought down to the reference point; and a reset push button 62 is activated. This provides a signal to reset the counter 64 and the storage devices 66 and 68. Next, the gage is moved up to the tip of the tool or other point to be measured. When the gage is at rest on the tip of the tool, the counter 64 contains a number representing the distance from the reference point to the tip of the tool.

This number is displayed by the readout 70 and is an input to a buffer circuit 72 which produces an output signal from the control circuit 60. Typically, the buffer circuit isolates the counter outputs and provides an increased drive capability. There are many types of buffer circuits available in the art, and many times the buffer circuits are commercially supplied as a part of the counter circuit. At this time, an enterdata push button 74 is activated; and an interrupt circuit 76 contained in the interfacing circuit 77 produces an interrupt signal through an isolation circuit 78 to the processing unit 80 of the computer 81. The use of an isolation circuit is standard design practice, and many types of isolation circuits are commercially available. Its primary purposes are to isolate noise from the computer and separate ground signals. The computer signal from the buffer 72 via an insolation circuit 82 and is operative to store said signal in a storage circuit 84. There are many techniques for transmitting this information into the computer; however, in the preferred embodiment, the computer samples the output signal from the buffer 72 twice and compares the two sampled signals. If the gage moves during the sample period, or if some other error occurs, the two sampled signals will not be identical; and the computer will produce an error signal via line 86 to a decode and storage circuit 68. This circuit will via isolation circuit 88 illuminate a failure light 90. Before the tool length data may be input again, the gage must be realigned with the reference point; and the reset push button 62 executed. If the sampling process of the output signal from the buffer circuit 72 produces identical signals, the output signal is stored in a storage circuit 84; and the computer produces a signal via line 86 which is decoded and stored in the circuit 66 produces a signal through the isolation circuit 92 and illuminates a data entered light 94.

According to one mode of operation, each tool is first loaded into the gaging system; and the tool length is measured and entered in the computer. To facilitate this operation, a tool number switch 96 produces a signal via the isolation circuit 99 to the computer 81 which represents a predetermined tool number. Therefore, as each tool is loaded into the gaging system, the tool number is entered in the tool number switches; and the length of the tool is then loaded into the proper storage location in the computer. After the tool length has been gaged, the tool is then loaded into the machine tool. After the first several tools have been measured and loaded into the machine, the machining cycle may be initiated. The remaining tool lengths may be measured while the machining operation is being executed. This technique of measuring the tool length is substantially easier and less time consuming than if the tool length is measured after the tool is loaded into the machine tool spindle.

The circuit of FIG. 4 provides another embodiment of the gaging system which reduces to zero the loss of machining time in setting tool lengths. In this embodiment, a mode selection switch 98 provides one or two possible modes. In a first mode the output signals from the buffer 72 are connected through the computer 81 directly to an active storage circuit corresponding to the tools presently being used in the machine tool. However, while a particular job using these tools is being run, the operator may then switch the mode switch to the second mode and measure the tools to be used on a subsequent job. In this case, with the mode switch in the second mode, the output signals from the buffer 72 and the tool number switch 96 are input into a next job store 102. Therefore, when the present job has finished and the program for the next job is loaded in the computer, the operator merely loads the tools required for the next job into the machine tool; and the computer is instructed to transfer the tool lengths from the next job store 102 to the active job store 100. Consequently, no machining time is lost in measuring tool lengths.

FIG. 5 is a block diagram illustrating the gaging system operating in conjunction with a numerical control which does not contain storage circuits. Once again, the measuring apparatus 40 operates in the manner heretofore described and produces measurement signals to a control circuit 60. The control circuit 60 contains essentially the same elements as are in the control circuit described with reference to FIG. 4. In the case of FIG. 5, the interfacing circuit 104 is substantially different. A decoder circuit 106 is responsive to the output signal from the buffer 72 and generates a new output signal representing the tool length in a number system which is compatible with the numerical control 108. A cycle control circuit 110 is responsive to the tool number switch 96 and an enter data switch 74 to load the new output signal from the decoder 106 into a storage circuit 112. Consequently, when the numerical control requires tool length information, a tool number address is generated on a line 114 and addresses a unique storage location in the storage circuit 112. The tool length information contained in that storage location is output to the numerical control on line 116.

Again, this circuit is capable of an alternative embodiment. Where there are a number of numerical controls without a storage capability, it is possible to provide a number of storage circuits similar to the storage circuit 112 and dedicate a storage circuit to each numerical control. Consequently, one of the storage circuits could be loaded with the appropriate tool lengths, and the remainder of the gaging system disconnected therefrom and connected to another storage circuit to load the appropriate tool lengths therein. In this manner, the gaging system could be made to accommodate a great number of numerical controls.

FIG. 6 is a block diagram illustrating the gaging system operating in conjunction with a numerical control containing its own storage circuits. This, of course, is very similar to the alternative embodiment described with respect to FIG. 5. In this case, the measuring apparatus 40 produces measurement signals to the control circuits 60 which produces an output signal from the buffer 72. Interfacing circuit 118 contains a cycle control circuit 115 which produces signals via an isolation circuit 117 to control the transfer of the output signals from the buffer 72 to the storage circuit 120. In response to signals generated by the cycle control 115, the output signals are decoded by a decoder circuit 119 and loaded into the storage circuits 120 via an isolation circuit 121.

FIG. 7 is a block diagram illustrating the invention in a stand alone mode. In certain situations, it may not be practical or economical to place the gaging system in direct contact with the control system of the machine tool. It may be desired that the determination of tool lengths be done at a single central location; e.g., a tool room. Once again the measuring apparatus 40 produces measurement signals to a control circuit 60 which produces output signals to an interfacing circuit 77 similar to that shown in FIG. 4. A computer 124 is responsive to tool number signals and the output signals and is operative to drive an input/output device 126. Such a device may be a magnetic tape recorder, a paper tape punch, etc. In this case, the tool lengths corresponding to the respective tool numbers are measured; and both the tool numbers and tool lengths are recorded on a storage medium. When the tools are routed to a particular machine tool, the medium containing the tool lengths information is included. When the operator loads the tools into the machine, he then loads the medium into a reading device and automatically inputs the tool lengths into the machine control.

While the invention has been illustrated in some detail according to the preferred embodiment shown in the accompanying drawings, and while the preferred illustrated embodiments have been described in some detail, there is no intention to thus limit the invention to such details. On the contrary, it is intended to cover all modifications, alterations and equivalents falling within the spirit and scope of the appended claims.

What is claimed is:

1. An apparatus for generating dimensional information for a plurality of cutting tools, said apparatus operating in conjunction with and being remotely located from a computer having a storage circuit and controlling a machine tool, the apparatus comprising:
   a. a base including means affixed thereto for maintaining a cutting tool in a stationary position;
   b. a manually operable gaging apparatus attached to the base for measuring on each cutting tool the distance from a point on the cutting tool to a reference point and providing measurement signals as a function of the distance measured;
   c. a control circuit responsive to the measurement signals for storing said measurement signals and generating a corresponding output signal representing the distance measured, said circuit including means for generating an interrupt signal and an identification signal representing a predetermined numerical identification of the cutting tool; and
   d. an interfacing circuit connected between the control circuit and the computer and including
      1. means for isolating all signals transferred between the control circuit and the computer,
      2. means for interrupting the operation of the computer in response to the interrupt signal and transmitting the output signal and a corresponding identification signal to the storage circuit, whereby the output signal is stored in the storage circuit at a location corresponding to the identification signal, and
      3. means responsive to the computer for decoding and transmitting signals to the control circuit.

2. An apparatus for generating dimensional information for a number of cutting tools, said apparatus operating in conjunction with and being remotely located from a numerical control and its associated machine, the apparatus comprising:
   a. a base member having means affixed thereto for maintaining a cutting tool in a stationary position;
   b. a manually operable gaging apparatus for measuring on each cutting tool the distance from a point on the cutting tool to a reference point and producing measurement signals representing increments of the distance measured;
   c. a control circuit responsive to the measurement signals and including
      1. means for accumulating and storing the measurement signals and producing an output signal representing the distance measured,
      2. switching means for selectively producing an identification signal for each cutting tool, and
      3. switching means for initiating a transfer of the output signal from the control circuit;
   d. an interfacing circuit connected to the control circuit and including
      1. storage means having a number of storage locations corresponding to the number of cutting tools, and
      2. means responsive to the initiating means for causing the output signal to be transferred to a storage location selected by a corresponding identification signal; and
   e. communication lines between the storage means and the numerical control, said numerical control producing on one communication line an addressing signal associated with a first cutting tool, and said storage means being responsive to the addressing signal for producing to the numerical control on the other communication line the output signal corresponding to the first cutting tool.

3. The apparatus of claim 2, wherein the control circuit further comprises means responsive to the accumulating and storing means for providing a numerical visual display representing the distance measured.

4. The apparatus of claim 3, wherein the interfacing circuit further includes means responsive to the output signal and connected to the storage means for decoding each output signal to produce a new output signal representing the distance measured in a number system compatible with the numerical control.

5. An apparatus for generating dimensional information for a number of cutting tools, said apparatus operating in conjunction with and being remotely located from a numerical control and its associated machine, said numerical control including a storage circuit having a number of storage locations corresponding to the number of cutting tools, the apparatus comprising:
   a. a base member having means affixed thereto for maintaining a cutting tool in a stationary position;
   b. a manually operable gaging apparatus attached to the base for measuring on each cutting tool the distance from a point on the cutting tool to a reference point and providing measurement signals representing increments of the distance measured;
   c. a control circuit responsive to the measurement signals and including
      1. means responsive to the measurement signals for accumulating and storing the measurement signals and producing an output signal representing the distance measured,
      2. switching means for selectively producing an identification signal for each cutting tool, and
      3. switching means for initiating a transfer of the output signal from the control circuit;
   d. an interfacing circuit connected to the control circuit and including means responsive to the initiating means for causing the output signal to be transferred to a storage location in the storage circuit of the numerical control as determined by a corresponding identification signal.

6. The apparatus of claim 5, wherein the control circuit further comprises means responsive to the accumulating and storing means for providing a numerical visual display representing the distance measured.

7. The apparatus of claim 6, wherein the interfacing circuit further includes means responsive to the output signals for decoding each output signal to produce a new output signal representing the distance measured in a number system compatible with the numerical control.

8. An apparatus for producing an input record containing dimensional information relative to a number of cutting tools, said input record being subsequently used by a numerical control simultaneously with said cutting tools being used by an associated machine, said apparatus being remotely located from the numerical control and its associated machine, the apparatus comprising:
a. a base member having means affixed thereto for maintaining a cutting tool in a stationary position;
b. a manually operable gaging apparatus attached to the base member for measuring on each of the cutting tools a distance from a point on the cutting tool to a reference point and producing measurement signals representing increments of the distance measured;
c. a control circuit responsive to the measurement signals and including
  1. means responsive to the measurement signals for accumulating and storing the measurement signals and producing an output signal representing the distance measured,
  2. switching means for selectively producing an identification signal for each cutting tool, and
  3. switching means for initiating a transfer of the output signal from the control circuit;
d. an input output device including a recording medium; and
e. means responsive to each output signal and a corresponding identification signal for energizing the input/output device to record the identification signals and the output signals on the storage medium thereby creating said input record.

9. The apparatus of claim 8, wherein said control circuit further includes means responsive to the accumulating and storing means for producing a numerical visual display of the distance measured.

* * * * *